(12) United States Patent
Zhou et al.

(10) Patent No.: US 10,965,918 B2
(45) Date of Patent: Mar. 30, 2021

(54) PROJECTION SYSTEM AND IMAGE MODULATION METHOD

(71) Applicant: APPOTRONICS CORPORATION LIMITED, Guangdong (CN)

(72) Inventors: Yuxuan Zhou, Shenzhen (CN); Baoying Zhang, Shenzhen (CN); Yi Li, Shenzhen (CN)

(73) Assignee: Appotronics Corporation Limited, Shenzhen (CN)

( * ) Notice: Subject to any disclaimer, the term of this patent is extended or adjusted under 35 U.S.C. 154(b) by 211 days.

(21) Appl. No.: 16/081,407

(22) PCT Filed: Apr. 20, 2017

(86) PCT No.: PCT/CN2017/081223
§ 371 (c)(1),
(2) Date: Aug. 30, 2018

(87) PCT Pub. No.: WO2017/219747
PCT Pub. Date: Dec. 28, 2017

(65) Prior Publication Data
US 2020/0396425 A1   Dec. 17, 2020

(30) Foreign Application Priority Data
Jun. 24, 2016 (CN) .......................... 201610468037.6

(51) Int. Cl.
*H04N 9/31* (2006.01)
(52) U.S. Cl.
CPC ......... *H04N 9/3105* (2013.01); *H04N 9/3155* (2013.01); *H04N 9/3182* (2013.01)
(58) Field of Classification Search
CPC .... G03B 21/006; G03B 21/008; G03B 21/28; G03B 21/204; G03B 21/2013;
(Continued)

(56) References Cited

U.S. PATENT DOCUMENTS

| | | | | |
|---|---|---|---|---|
| 2007/0013965 | A1* | 1/2007 | Iwanaga | H04N 9/3114 358/406 |
| 2014/0225934 | A1 | 8/2014 | Liu | |
| 2018/0249137 | A1* | 8/2018 | Kobayashi | H04N 9/312 |

FOREIGN PATENT DOCUMENTS

| | | |
|---|---|---|
| CN | 101119459 A | 2/2008 |
| CN | 102854592 A | 1/2013 |

(Continued)

OTHER PUBLICATIONS

International Search Report of corresponding Patent Application No. PCT/CN2017/081223—4 pages (dated Jul. 12, 2017).

(Continued)

*Primary Examiner* — Sultan Chowdhury
(74) *Attorney, Agent, or Firm* — Knobbe, Martens, Olson & Bear, LLP

(57) ABSTRACT

A projection system includes a light emitting device, a light valve and a control device. The light emitting device emits light of colors at least including a first color, a second color and a third color, and the third color is a color mixing the first color and the second color. The control device acquires gray scale values corresponding to at least the first color and the second color of each pixel point in an input image, and determines gray scale values corresponding to the first color, the second color and the third color of a corresponding pixel point in a pre-displayed image according to the gray scale values corresponding to the first color and the second color. The present disclosure also provides an image modulation method applied to the projection system.

20 Claims, 3 Drawing Sheets

(58) Field of Classification Search
CPC ............ G03B 21/2033; G03B 21/2053; H04N 9/315; H04N 9/3105; H04N 9/3111; H04N 9/3114; H04N 9/3117; H04N 9/3155; H04N 9/3158; H04N 9/3161; H04N 9/3164; H04N 9/3182; F21V 13/08; F21V 13/14
See application file for complete search history.

(56) References Cited

FOREIGN PATENT DOCUMENTS

| | | | |
|---|---|---|---|
| CN | 105022208 A | 11/2015 | |
| EP | 1227687 A2 | 7/2002 | |
| EP | 1227687 A3 | 5/2005 | |
| EP | 2579073 A1 | 4/2013 | |
| JP | 2009-009082 A | 1/2009 | |
| JP | 2009-229758 A | 10/2009 | |
| JP | 2010-181694 A | 8/2010 | |
| KR | 10-2006-0114941 A | 11/2006 | |
| KR | 10-2012-0103072 A | 9/2012 | |

OTHER PUBLICATIONS

European Office Action issued in application No. 17814485.3 dated Aug. 6, 2020.
Extended European Search Report issued in application No. 17814485.3 dated Aug. 26, 2019.
Japanese Office Action issued in application No. 2018-545868 dated Aug. 8, 2019.

\* cited by examiner

PROJECTION SYSTEM AND IMAGE MODULATION METHOD

CROSS-REFERENCE TO RELATED APPLICATIONS

The present application is a national phase applications of International Application No. PCT/CN2017/081223 filed on Apr. 20, 2017, which claims priority to Chinese Patent Application No. 201610468037.6, filed on Jun. 24, 2016, the contents of each of which are incorporated herein by reference in its entirety and made a part of this specification.

TECHNICAL FIELD

The present disclosure relates to the field of projection technologies, and in particular, to a projection system and an image modulation method.

BACKGROUND

At present, the projection devices are widely used in various applications such as playing movie, conferencing, and advertising. The light modulation technologies in the projection device generally include a triple light valve modulation technology and a single light valve modulation technique. In the triple light valve modulation technology, monochromatic light of the three primary colors of red, green and blue are respectively modulated by three different light valves, a monochromatic image of each primary color light is generated, and then the monochromatic images are combined by a spectroscopic filter or other light combining device so as to form a color image, which may be displayed on the screen. In the single light valve modulation technology, a monochromatic light sequence having red, green and blue periodically changed is modulated by a light valve, thereby obtaining a corresponding primary color image sequence having red, green and periodically changed.

SUMMARY

Technical Problem to be Solved

At this time, as long as the image sequence changes rapidly enough, the human eyes cannot distinguish the primary color images, and thus the primary color image sequence may be synthesized into a color image by the visual residual phenomenon of the human eyes. For both the triple light valve modulation technology and the single light valve modulation technology, the image modulation is conventionally performed with red, green and blue primary colors, and the color saturation of the displayed image is not high.

Solution to the Problem

In view of this, it is necessary to provide a projection system and an image modulation method, aiming to avoid the above problem.

The present disclosure provides a projection system. The projection system includes: a light emitting device, configured to emit light of colors including at least a first color, a second color and a third color, wherein the third color is a color mixing the first color and the second color; a light valve; and a control device, configured to acquire data on an input image, and the data includes gray scale values corresponding to at least the first color and the second color of each pixel point in the input image, and to determine gray scale values corresponding to the first color, the second color and the third color of a corresponding pixel point in a pre-displayed image in accordance with the gray scale values corresponding to the first color and the second color. The gray scale value corresponding to the third color of the corresponding pixel point in the pre-displayed image is smaller than or equal to a smaller one of the gray scale value corresponding to the first color of the corresponding pixel point in the data on the input image and the gray scale value corresponding to the second color of the corresponding pixel point in the data on the input image. The gray scale value corresponding to the first color of the corresponding pixel point in the pre-displayed image is equal to a gray scale value difference between the gray scale value corresponding to the first color of the corresponding pixel point in the data on the input image and the gray scale value corresponding to the third color of the corresponding pixel point in the data on the input image, and the gray scale value corresponding to the second color of the corresponding pixel point in the pre-displayed image is equal to a gray scale value difference between the gray scale value corresponding to the second color of the corresponding pixel point in the data on the input image and the gray scale value corresponding to the third color of the corresponding pixel point in the data on the input image. The control device is further configured to control the light valve to modulate light of corresponding colors emitted from the light emitting device in accordance with the determined gray scale values corresponding to the corresponding colors of each pixel point in the pre-displayed image, so as to form an image corresponding to the pre-displayed image data.

As an option, the light emitting device is configured to emit light of a fourth color, the data on the input image further includes a gray scale value corresponding to the fourth color of each pixel point in the input image, the control device is configured to determine a gray scale value corresponding to the fourth color of a corresponding pixel point in the pre-displayed image according to the gray scale value corresponding to the fourth color of each pixel point in the input image, and the control device is configured to control the light valve to perform modulation in accordance with the gray scale value corresponding to the fourth color of a corresponding pixel point in the pre-displayed image when the light emitting device emits the fourth color.

As an option, the gray scale values of the first color and the second color of one pixel point in the input image are respectively N1 and N2, wherein N1≥N2, the control device controls the light valve to perform modulation by taking a gray scale value as N2 when the light emitting device emits light of the third color, and the control device controls the light valve to perform modulation by taking a gray scale value at a corresponding pixel point as (N1−N2) when the light emitting device emits light of the first color.

As an option, the light emitting device includes a light source and a color wheel, and the color wheel includes a first section, a second section, and a third section; when light emitted from the light source illuminates the first section, the second section, and the third section, the light of the first color, the light of the second color and the light of the third color are respectively emitted.

As an option, the control device controls time periods during which the first section, the second section and the third section are in an optical path to be T1, T2, and T3, respectively; in accordance with first color frame image data, second color frame image data and third color frame image data of a frame of color image, an image parsing module obtains first color image data, second color image data and third color image data, obtains gray scale values corresponding to the first color, the second color and the third color of each pixel, and further obtains maximum gray scale values for each pixel point in the first color image data, the second color image data and the third image data, which are recorded as d1, d2 and d3, respectively, from statistics. The control device controls durations during which the light emitting device is turned on in modulation time periods of the first color, the second color and the third color to be: T1×d1/255, T2×d2/255, and T3×d3/255, respectively.

As an option, the control device controls time periods during which the first section, the second section and the third section are set in the optical path to be T1, T2 and T3, respectively, the control device controls a duration during which the first section is illuminated by the light source to be T1×((N1−N2)/255), sets a duration during which the second section is illuminated by the light source as 0, and controls a duration during which the third section is illuminated by the light source to be T1×(N2/255).

As an option, T1=T2=T3.

As an option, the light source is an excitation light source, the first section supports a wavelength converting material layer for light of the first color, the wavelength converting material layer for light of the first color is capable of absorbing excitation light and emits the light of the first color, the second section supports a wavelength converting material layer for light of the second color, the wavelength converting material layer for light of the second color is capable of absorbing excitation light and emits the light of the second color, and the third section supports a wavelength converting material layer for light of the third color and is capable of absorbing excitation light and emits the light of the third color.

As an option, the wavelength converting material layer for light of the first color is a red phosphor, the wavelength converting material layer for light of the second color is a green phosphor, and the wavelength converting material layer for light of the third color is a yellow phosphor.

As an option, the color wheel further includes a fourth section, a fourth color light is emitted when the light emitted from the light source illuminates the fourth section; the data on the input image includes a gray scale value corresponding to the fourth color of each pixel point in the input image, and the control device is configured to determine the gray scale value corresponding to the fourth color of the corresponding pixel point in the pre-displayed image in accordance with the gray scale value corresponding to the fourth color; and the control device is configured to control the light valve to perform modulation according to the gray scale value corresponding to the fourth color of the corresponding pixel point in the pre-displayed image when the color wheel emits the fourth color.

As an option, the light source is an ultraviolet excitation light, the fourth section supports a wavelength converting material layer for light of the fourth color, and the wavelength converting material layer for the light of the fourth color is capable of absorbing excitation light and emitting the light of the fourth color.

As an option, the light source is a blue excitation light source and the fourth section is a light transmissive layer that can transmit blue light.

As an option, the first color is red, the second color is green, and the third color is yellow.

The present disclosure further provides an image modulation method, applied to a projection system. The image modulation method includes following steps of: acquiring data on an input image, the data including gray scale values corresponding to at least the first color and the second color of each pixel point in the input image; determining gray scale values corresponding to the first color, the second color and the third color of a corresponding pixel point in a pre-displayed image in accordance with the gray scale values corresponding to the first color, the second color and the third color; wherein the third color is a color mixing the first color and the second color, the gray scale value corresponding to the third color of the corresponding pixel point in the pre-displayed image is smaller than or equal to a smaller one of the gray scale value corresponding to the first color of the corresponding pixel point in the data on the input image and the gray scale value corresponding to the second color of the corresponding pixel point in the data on the input image; and wherein the gray scale value corresponding to the first color of the corresponding pixel point in the pre-displayed image is equal to a gray scale value difference between the gray scale value corresponding to the first color of the corresponding pixel point in the data on the input image and the gray scale value corresponding to the third color of the corresponding pixel point in the data on the input image, and the gray scale value corresponding to the second color of the corresponding pixel point in the pre-displayed image is equal to a gray scale value difference between the gray scale value corresponding to the second color of the corresponding pixel point in the data on the input image and the gray scale value corresponding to the third color of the corresponding pixel point in the data on the input image; and controlling a light valve to modulate light of corresponding colors emitted from the light emitting device in accordance with the determined gray scale values corresponding to the corresponding colors of each pixel point in the pre-displayed image, so as to form an image corresponding to the pre-displayed image data.

As an option, the acquired data on the input image further includes a gray scale value corresponding to a fourth color of each pixel point in the input image, a gray scale value corresponding to the fourth color of a corresponding pixel point in the pre-displayed image is determined according to the gray scale value corresponding to the fourth color of each pixel point in the input image, and the light valve is controlled to perform modulation in accordance with the gray scale value corresponding to the fourth color of a corresponding pixel point in the pre-displayed image when the light emitting device emits the fourth color.

As an option, the gray scale values of the first color and the second color of one pixel point in the input image are respectively N1 and N2, wherein N1≥N2, the light valve is controlled to perform modulation at a corresponding pixel point by taking a gray scale value as N2 when the light emitting device emits light of the third color, the light valve is controlled to perform modulation by taking a gray scale value at a corresponding pixel point as (N1−N2) when the light emitting device emits light of the first color, and the light valve is controlled to stop working in a time period during which the light emitting device is designed to emit light of the second color.

As an option, the light emitting device includes a light source and a color wheel, and the color wheel includes a first section, a second section, and a third section; when light emitted from the light source illuminates the first section, the second section, and the third section, the light of the first color, the light of the second color and the light of the third color are respectively emitted.

As an option, time periods during which the first section, the second section and the third section are set in an optical path are controlled to be T1, T2 and T3, respectively; in accordance with first color frame image data, second color frame image data and third color frame image data of a frame of color image, first color image data, second color image data and third color image data is obtained, gray scale values corresponding to the first color, the second color and the third color of each pixel are obtained, and maximum gray scale values for each pixel point in the first color image data, the second color image data and the third image data, which are recorded as d1, d2 and d3, respectively, are further obtained from statistics; and wherein durations during which the light emitting device is turned on in modulation time periods of the first color, the second color and the third color are controlled to be T1×d1/255, T2×d2/255, and T3×d3/255, respectively.

As an option, in the step of controlling the light device to alternately emit the light of the first color, the light of the second color and the light of the third color, time periods during which the first section, the second section, the third section and the fourth section of the color wheel are set in the optical path are controlled to be T1, T2 and T3, respectively, a duration during which the first section is illuminated by the light source is controlled to be T1×((N1−N2)/255), a duration during which the second section is illuminated by the light source is controlled to be 0, and a duration during which the third section is illuminated by the light source is controlled to be T1×(N2/255).

As an option, T1=T2=T3.

As an option, the light source is an excitation light source, the first section supports a wavelength converting material layer for light of the first color, the wavelength converting material layer for light of the first color is capable of absorbing excitation light and emits the light of the first color, the second section supports a wavelength converting material layer for light of the second color, the wavelength converting material layer for light of the second color is capable of absorbing excitation light and emits the light of the second color, and the third section supports a wavelength converting material layer for light of the third color and is capable of absorbing excitation light and emits the light of the third color.

As an option, the wavelength converting material layer for light of the first color is a red phosphor, the wavelength converting material layer for light of the second color is a green phosphor, and the wavelength converting material layer for light of the third color is a yellow phosphor.

As an option, the color wheel further includes a fourth section, a fourth color light is emitted when the light emitted from the light source illuminates the fourth section; the data on the input image includes a gray scale value corresponding to the fourth color of each pixel point in the input image, and the gray scale value corresponding to the fourth color of the corresponding pixel point in the pre-displayed image is determined in accordance with the gray scale value corresponding to the fourth color; and the light valve is controlled to perform modulation according to the gray scale value corresponding to the fourth color of the corresponding pixel point in the pre-displayed image, when the color wheel emits the fourth color.

As an option, the light source is an ultraviolet excitation light, the fourth section supports a wavelength converting material layer for light of the fourth color, and the wavelength converting material layer for the light of the fourth color is capable of absorbing excitation light and emitting the light of the fourth color.

As an option, the light source is a blue excitation light source and the fourth section is a light transmissive layer that can transmit blue light.

As an option, the first color is red, the second color is green, and the third color is yellow.

Advantageous Effect

Compared with the related art, the present disclosure provides a projection system and an image modulation method, in which a light valve takes light of four different colors emitted from a light emitting device as a light source for synthesizing a modulation image, thereby improving color diversity and color saturation. Moreover, a wavelength converting material layer for light of a first color is a red phosphor, a wavelength converting material layer for light of a second color is a green phosphor, a wavelength converting material layer for light of a fourth color is a blue phosphor, and a wavelength converting material layer for light of a third color is a yellow phosphor. The converting efficiency of yellow light generated by the yellow phosphor being stimulated is higher than the converting efficiency of red light generated by the red phosphor being stimulated, which can supplement the brightness of red light to some extent and thus improve the display quality of the projection system.

REFERENCE SIGNS

TABLE 1

| | |
|---|---|
| projection system | 100 |
| light emitting device | 10 |
| light source | 11 |
| color wheel | 13 |
| first section | 131 |
| second section | 133 |
| third section | 135 |
| fourth section | 137 |
| light valve | 20 |
| control device | 30 |
| control module | 31 |
| first control unit | 311 |
| second control unit | 313 |
| third control unit | 315 |
| image parsing module | 35 |

The present disclosure will be further described as follows in combination with the accompanying drawings.

DESCRIPTION OF EMBODIMENTS

In order to make the purpose, technical solutions, and advantages of the embodiments of the present disclosure to be clearer, the technical solutions in the embodiments of the present disclosure are described as follows with reference to the accompanying drawings. It should be noted that, the described embodiments are merely exemplary embodiments of the present disclosure, and shall not be interpreted as limiting the present disclosure. All other embodiments obtained by those skilled in the art without creative efforts according to the embodiments of the present disclosure are within the scope of the present disclosure. In addition, the embodiments in the present disclosure and the features in the embodiments may be combined with each other.

It should be noted that in the present disclosure, in a case where one component is considered to be "connected" to another component, it mains that the component is directly connected to the other component, or the component is indirectly connected to the other component through an intermediate component.

Unless otherwise being defined, all technical and scientific terms used herein have the same meaning as the terms commonly understood by those skilled in the art. And the terms used herein are merely for the purpose of describing embodiments and not intended to limit the present disclosure.

Figure 1:
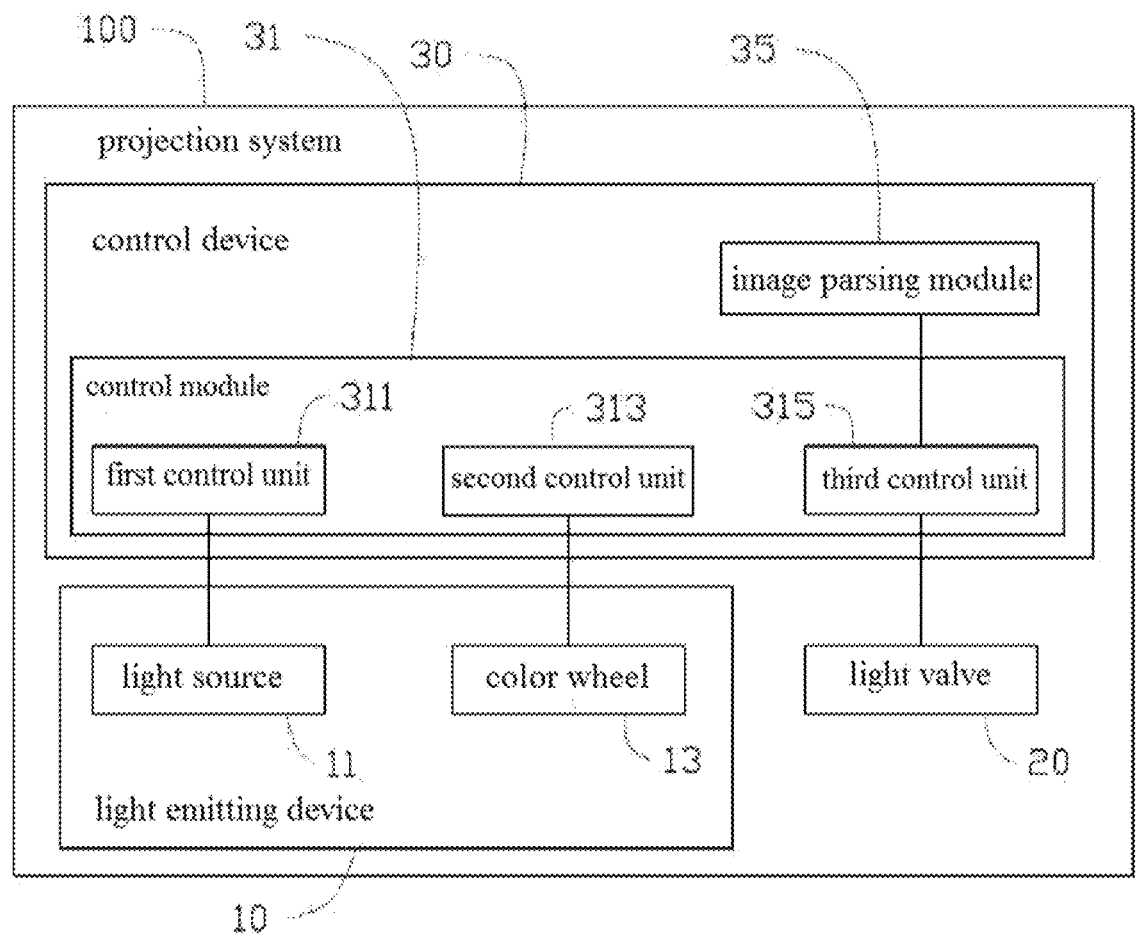
FIG. 1 is a schematic diagram of a projection system according to the present disclosure.

With reference to FIG. 1, an embodiment of the present disclosure provides a projection system 100, which includes a light emitting device 10, a light valve 20, and a control device 30. In this embodiment, the projection system 100 further includes necessary or unnecessary structural features such as a projection lens and a projection screen, which will not be further described herein.

The light emitting device 10 includes a light source 11 and a color wheel 13. The light source 11 is used to generate excitation light. Preferably, the excitation light is ultraviolet light. The light source 11 can be a light emitting diode, a laser diode or other solid-state light source.

Figure 2:
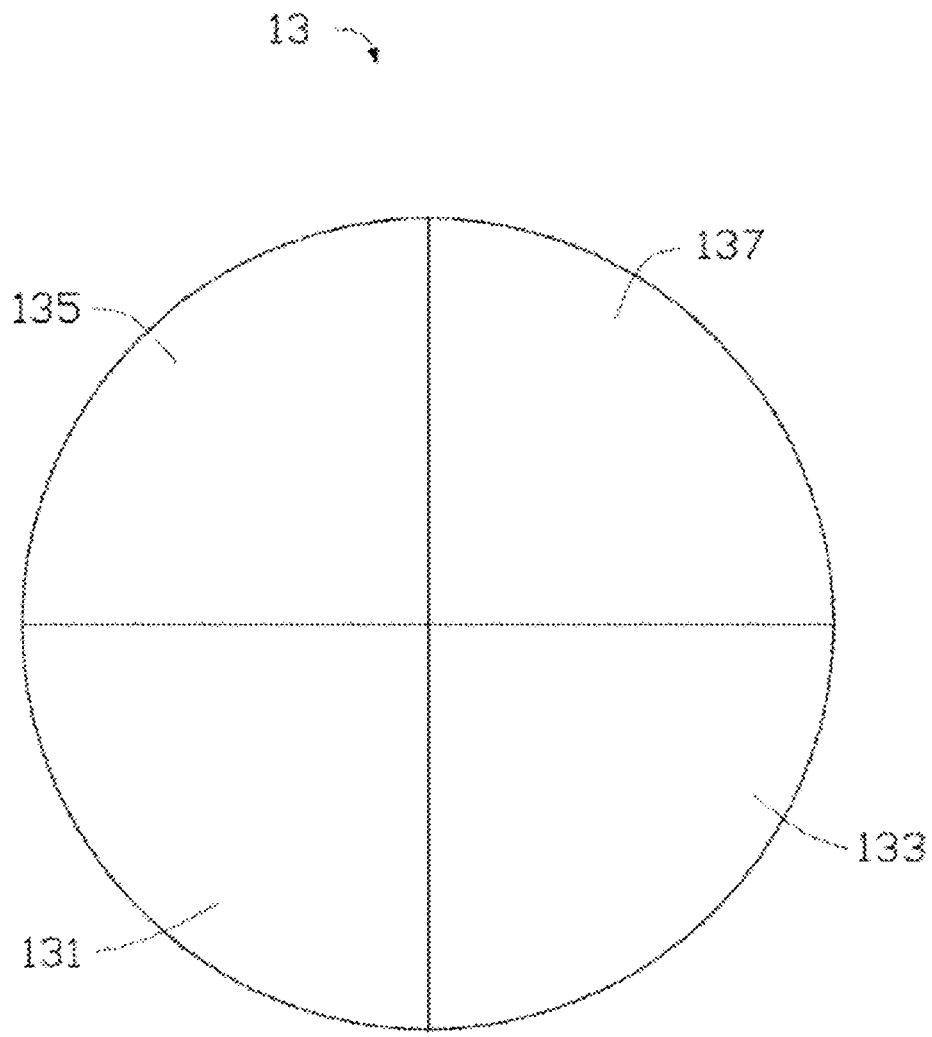
FIG. 2 is a schematic diagram of a color wheel of FIG. 1.

With reference to FIG. 2, the color wheel 13 supports a wavelength converting material. The color wheel 13 is driven to rotate by a driving device (not shown). In this embodiment, the color wheel 13 is transmissive, that is, light emitted from the color wheel 13 is the same as incident light. The color wheel 13 is a substantially disk-shaped color wheel structure including a first section 131, a second section 133, a third section 135 and a fourth section 137. The first section 131, the second section 133, the third section 135 and the fourth section 137 are all fan-shaped structures, and have a same size. It should be understood that in other embodiments, the first section 131, the second section 133, the third section 135 and the fourth section 137 can have different sizes. The first section 131 supports a wavelength converting material layer for light of a first color having a sufficient thickness, and the wavelength converting material layer for light of the first color can absorb the excitation light and emits light of the first color. The second section 133 supports a wavelength converting material for light of a second color having a sufficient thickness, and the wavelength converting material layer for light of the second color can absorb the excitation light and emit light of a second color. The third section 135 supports a wavelength converting material layer for light of a third color having a sufficient thickness, and the wavelength converting material layer for light of the third color can absorb the excitation light and emits light of a third color. The fourth section 137 supports a wavelength converting material layer for light of a fourth color having a sufficient thickness, and the wavelength converting material layer for light of the fourth color can absorb the excitation light and emits light of the fourth color. The wavelength converting material can be a phosphor, a quantum dot material, or other material that is capable of converting the excitation light into a laser light of a suitable color. The third color is a color mixing the first color and the second color.

In this embodiment, the light of the first color is red light, the light of the second color is green light, the light of the third color is yellow light, and the light of the fourth color is blue light. In this embodiment, the wavelength converting material layer for light of the first color is a red phosphor, the wavelength converting material layer for light of the second color is a green phosphor, the wavelength converting material layer for light of the fourth color is a blue phosphor, and the wavelength converting material layer for light of the third color is a yellow phosphor.

It should be understood that when the light source 11 emits blue excitation light, the fourth section 137 can be set as a transparent section. When the excitation light emitted from the light source 11 illuminates on the fourth section 137, the light emitted from the light source 11 directly passes through the fourth section 137. In other embodiments, the color wheel 13 can be reflective, that is, the propagation direction of the light emitted from the color wheel is substantially opposite to or at an angle with respect to the incident light. In other embodiments, the light source 11 can emit white light, and the wavelength converting material can be a filter material.

The first section 131, the second section 133, the third section 135 and the fourth section 137 are alternately disposed in the transmission path of the excitation light generated by the light source 11 when the color wheel 13 rotates, so that the light emitting device 10 alternately outputs a color sequence of the first color-the second color-the third color-the fourth color-the first color-the second color-the third color. It should be understood that the number of sections of the color wheel 13, the supported wavelength converting material, the rotation speed of the color wheel 13, and the like can be set according to the color sequence and duration that are actually required when emitting light.

The light valve 20 is set in the transmission path of the light emitted from the color wheel 13. The light emitted from the color wheel 13 can get into the light valve 20. Then, the light of the first color, the light of the second color, the light of the third color, and the light of the fourth color modulated by the light valve 20 reach the projection lens to project a display image. It should be understood that the light valve 20 can be an LCD, an LCoS, a DMD, etc.

The control device 30 includes a control module 31 and an image parsing module 35. The control module 31 includes a first control unit 311, a second control unit 313, and a third control unit 315. The first control unit 311 is configured to turn on or turn off the light source 11, the second control unit 313 is configured to control and drive the color wheel 13 to move, and the third control unit 315 is configured to control the light valve 20 to perform image modulation when the light source 11 is turned on.

The image parsing module 35 is connected to the third control unit 315, and is configured to receive an image signal and perform a parsing process on the received image signal so as to form data on an input image. The data on the input image includes data on each frame of color input image. The image parsing module 35 is configured to further modulate the input image.

The image parsing module 35 obtains the data on the input image. The data on the input image includes gray scale values corresponding to at least the first color and the second color of each pixel point in the image. The image parsing module 35 determines gray scale values corresponding to the first color, the second color and the third color of the corresponding pixel point in a pre-displayed image in accordance with the gray scale values corresponding to the first color and the second color. The gray scale value corresponding to the third color of the corresponding pixel point in the pre-displayed image is smaller than or equal to a smaller one of the gray scale value corresponding to the first color of the corresponding pixel point in the data on the input image and the gray scale value corresponding to the second color of the corresponding pixel point in the data on the input image. The gray scale value corresponding to the first color of the corresponding pixel point in the pre-displayed image is equal to a gray scale value difference between the gray scale value corresponding to the first color of the corresponding pixel point in the data on the input image and the gray scale value corresponding to the third color of the corresponding pixel point, and the gray scale value corresponding to the second color of the corresponding pixel point in the pre-displayed image is equal to a gray scale value difference between the gray scale value corresponding to the second color of the corresponding pixel point in the data on the input image and the gray scale value corresponding to the third color of the corresponding pixel point. The third color is a color mixing the first color and the second color. That is, the image modulation signal includes a gray scale value corresponding to the first color, a gray scale value corresponding to the second color, a gray scale value corresponding to the third color, and a gray scale value corresponding to the fourth color in the pre-displayed image. In this embodiment, the first color is red, the second color is green, the third color is yellow, and the fourth color is blue. The projection display image of the projection system 100 substantially coincides with the pre-displayed image.

In a certain frame of input color image obtained by the image parsing module 35, the gray scale values corresponding to the first color, the second color, and the fourth color of a certain pixel point are respectively: N1, N2, and N3, where N2≤N1, 0≤N1≤255, 0≤N2≤255, and 0≤N3≤255. A smaller one of the gray scale values corresponding to the first color and the second color of the pixel point is N2. N2 is determined as the gray scale value corresponding to the third color of the corresponding pixel point in the pre-displayed image. A difference between the gray scale value corresponding to the first color and the gray scale value corresponding to the third color is determined as the gray scale value corresponding to the first color of the corresponding pixel point in the pre-displayed image, and a difference between the gray scale value corresponding to the second color and the gray scale value corresponding to the third color is determined as the gray scale value corresponding to the second color of the corresponding pixel point in the pre-displayed image. The gray scale value corresponding to the fourth color in the pre-displayed image remains unchanged. Therefore, the gray scale values corresponding to the first color, the second color, the fourth color and the third color of the corresponding pixel point in the pre-displayed image are (N1−N2), 0, N3, and N2, respectively.

The second control unit 313 is used to control and drive the color wheel 13 to rotate. It is assumed that time required to modulate one frame of image is T, time periods during which the first section 131, the second section 133, the third section 135, and the fourth section 137 of the color wheel 13 are set in the optical path are T1, T2, T3 and T4, respectively, and T is a sum of T1, T2, T3 and T4.

During the time period T1 when the first section 131 is set in the optical path, the first control unit 311 controls the light source 11 to be turned on within a duration of (N1−N2)/255 in T1. That is, the duration during which the first section 131 is illuminated by the light source 11 is T1×((N1−N2)/255), and the third control unit 315 controls the light valve 20 to perform image modulation at a corresponding pixel point in accordance with the gray scale value (N1−N2) corresponding to the first color. Correspondingly, during the time period T2 when the second section 133 is set in the optical path, the first control unit 311 controls the light source 11 to be turned off, and the third control unit 315 controls the light valve 20 not to work. During the time period T3 when the third section 135 is set in the optical path, the first control unit 311 controls the light source 11 to be turned on within a duration of N2/255 in T3. That is, the duration during which the third section 135 is illuminated by the light source 11 is: T3×(N2/255), and the light valve 20 is controlled to perform image modulation at the corresponding pixel point in accordance with the gray scale value N2 corresponding to the third color during the time period when the light source 11 is turned on. During the time period T4 when the fourth section 137 is set in the optical path, the first control unit 311 controls the light source 11 to be turned on within a duration of N3/255 in T4. That is, the duration during which the fourth section 137 is illuminated by the light source is: T4×(N3/255), and the third control unit 315 controls the light valve 20 to perform image modulation at the corresponding pixel point in accordance with the gray scale value N3 corresponding to the fourth color during the time period when the light source 11 is turned on.

In this embodiment, it is assumed that the time periods during which the first section 131, the second section 133, the third section 135, and the fourth section 137 are set in the optical path are all T/4. For example, N1 is 250, N2 is 200, and N3 is 100. In this example, a smaller one of the gray scale values corresponding to the first color and the second color of the pixel point is 200, and the image parsing module 35 takes the smaller value 200 as the gray scale value corresponding to the third color of the corresponding pixel point in the pre-displayed image. The gray color values corresponding to the first color, the second color, the third color, and the fourth color of the pixel point in the pre-displayed image corresponding to the input image are 50, 0, 200, and 100, respectively. The duration during which the first section 131 is illuminated by the light source 11 is (T/4)×(50/255). The duration during which the third section 135 is illuminated by the light source 11 is: (T/4)×(200/255). The duration during which the fourth section 137 is illuminated by the light source 11 is: (T/4)×(100/255).

It should be understood that the light emitting device 10 further includes an optical component such as a light homogenizing device (not shown), so as to improve quality of light emitted by the light emitting device 10.

In an embodiment, in accordance with red frame image data, green frame image data, and blue frame image data of a frame of color image, the image parsing module 35 obtains data on four frames of image (i.e., the red frame image data, the green frame image data, the yellow frame image data, and the blue frame image data), obtains gray scale values corresponding to red, green, yellow and blue of each pixel, and further obtains the maximum gray scale values for each pixel point in the data of the four frames of image (i.e., the red frame image data, the green frame image data, the yellow frame image data, and the blue frame image data) from statistics, which are recorded as d1, d2, d3, and d4, respectively. The first control unit 311 controls durations during which the light source 11 is turned on in modulation time periods of red light, green light, yellow light and blue light to be T1×d1/255, T2×d2/255, T3×d3/255, and T4×d4/255, respectively, thereby saving energy of the light source.

It should be understood that the light emitting device 10 of the projection system 100 can emit at least light of the first color, light of the second color, and light of the third color, that is, the fourth section 137 can be omitted from the color wheel 13.

Figure 3:
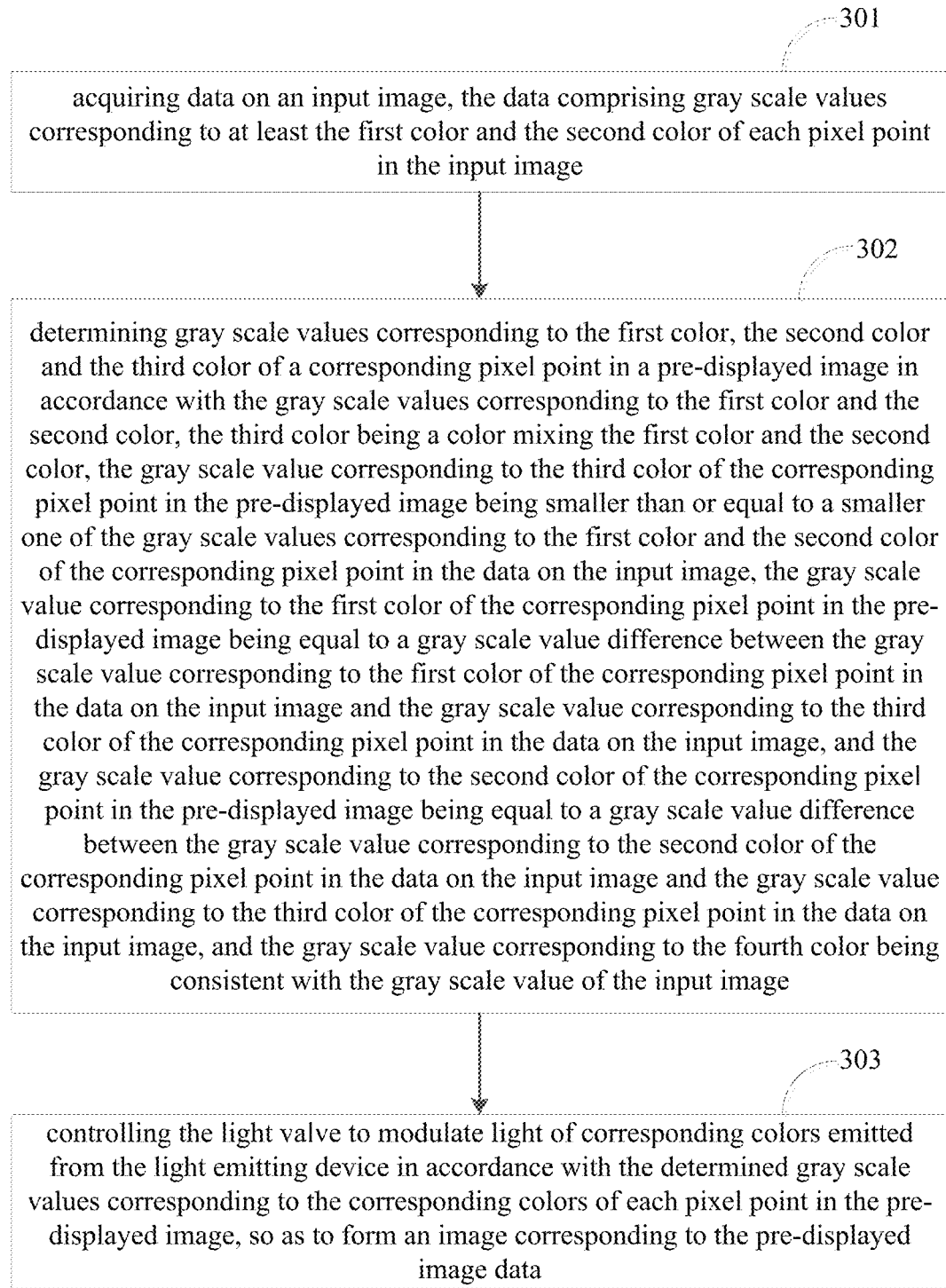
FIG. 3 is a schematic flow chart of an image modulation method according to the present disclosure.

The present disclosure further provides an image modulation method applied to the projection system 100. With reference to FIG. 3, the image modulation method includes the following steps.

At step 301, data on an input image is acquired, and the data on the input image includes gray scale values corresponding to at least a first color and a second color of each pixel point in the image.

Specifically, gray scale values corresponding to the first color, the second color, and the fourth color of each pixel point in each frame of color image are acquired by the image parsing module 35. Gray scale values corresponding to the first color, the second color, and the fourth color of a certain pixel point in a certain frame of input color image are N1, N2, and N3, respectively, where N1≥N2, 0≤N1≤255, 0≤N2≤255, and 0≤N3≤255.

At step 302, gray scale values corresponding to the first color, the second color, and the third color of a corresponding pixel point in the pre-displayed image are determined in accordance with the gray scale values corresponding to the first color and the second color. The third color is a color mixing the first color and the second color. The gray scale value corresponding to the third color of the corresponding pixel point in the pre-displayed image is smaller than or equal to a smaller one of the gray scale value corresponding to the first color of the corresponding pixel point in the data on the input image and the gray scale value corresponding to the second color of the corresponding pixel point in the data on the input image. The gray scale value corresponding to the first color of the corresponding pixel point in the input image is equal to a gray scale value difference between the gray scale value corresponding to the first color of the corresponding pixel point in the input image and the gray scale value corresponding to the third color, the gray scale value corresponding to the second color of the corresponding pixel point in the input image is equal to a gray scale value difference between the gray scale value corresponding to the second color of the corresponding pixel point in the input image and the gray scale value corresponding to the third color, and the gray scale value corresponding to the fourth color is consistent with the gray scale value of the input image.

Specifically, the smaller one of the gray scale values corresponding to the first color and the second color of the abovementioned pixel point is N2. N2 is determined by the image parsing module 35 as the gray scale value corresponding to the third color of the corresponding pixel point in the pre-displayed image. A difference between the gray scale value corresponding to the first color and the gray scale value corresponding to the third color and a difference between the gray scale value corresponding to the second color and the gray scale value corresponding to the third color are respectively calculated and determined by the image parsing module 35 as the gray scale values corresponding to the first color of the corresponding pixel point in the pre-displayed image and the second color of the corresponding pixel point in the pre-displayed image. The gray scale value corresponding to the fourth color in the pre-displayed image remains unchanged. Therefore, the gray scale values corresponding to the first color, the second color, the fourth color and the third color of the corresponding pixel point in the pre-displayed image are (N1−N2), 0, N3, and N2, respectively.

At step 303, the light valve 20 is controlled to modulate light of corresponding colors emitted from the light emitting device 10 in accordance with the determined gray scale value corresponding to the corresponding color of each pixel point in the pre-displayed image, so as to form an image corresponding to the pre-displayed image data.

The time periods when the first section 131, the second section 133, the third section 135, and the fourth section 137 of the color wheel 13 are in the optical path are controlled by the second control unit 313. The durations during which the light source 11 illuminates the first section 131, the second section 133, the third section 135 and the fourth section 137 are controlled by the first control unit 311. It is assumed that the time required to modulate one frame of image is T, and time periods during which the first section 131, the second section 133, the third section 135, and the fourth section 137 of the color wheel 13 are in the optical path are T1, T2, T3 and T4, respectively, and T is a sum of T1, T2, T3 and T4. When the first section 131 is set in the optical path within the time period T1/4, the first control unit 311 controls the light source 11 to be turned on during the duration of (N1−N2)/255 of T1, i.e., the duration during which the first section 131 is illuminated by the light source 11 is: T1×((N1−N2)/255), and the third control unit 315 controls the light valve 20 to perform image modulation at the corresponding pixel point in accordance with the gray scale value (N1−N2) corresponding to the first color. Correspondingly, when the second section 133 is set in the optical path within the time period T2, the first control unit 311 controls the light source 11 to be turned off, and the third control unit 315 controls the light valve 20 not to work. When the third section 135 is set in the optical path within the time period T3, the first control unit 311 controls the light source 11 to be turned on during the duration of N2/255 of T3, i.e., the duration during which the third section 135 is illuminated by the light source 11 is: T3×(N2/255), and the light valve 20 is controlled to perform image modulation at the corresponding pixel point in accordance with the gray scale value N2 corresponding to the third color during the time period when the light source 11 is turned on. When the fourth section 137 is set in the optical path within the time period T4, the first control unit 311 controls the light source 11 to be turned on during the duration of N3/255 of T4, i.e., the duration during which the fourth section 137 is illuminated by the light source is T4×(N3/255), and the third control unit 315 controls the light valve 20 to perform image modulation at the corresponding pixel point according to the gray scale value N3 corresponding to the fourth color during the time period when the light source 11 is turned on.

In this embodiment, it is assumed that the time periods during which the first section 131, the second section 133, the third section 135 and the fourth section 137 in the optical path are all T/4. For example, N1 is 250, N2 is 200, and N3 is 100. In this example, a smaller one of the gray scale values corresponding to the first color and the second color of the pixel point is 200, and the image parsing module 35 takes the smaller value 200 as the gray scale value corresponding to the third color of the corresponding pixel point in the pre-displayed image. The gray color values corresponding to the first color, the second color, the third color, and the fourth color of the pixel point in the pre-displayed image corresponding to the input image are 50, 0, 200, and 100, respectively. The duration during which the first section 131 is illuminated by the light source 11 is (T/4)×(50/255). The duration during which the third section 135 is illuminated by the light source 11 is (T/4)×(200/255). The duration during which the fourth section 137 is illuminated by the light source 11 is (T/4)×(100/255).

In an embodiment, the control device controls time periods during which the first section, the second section and the third section are in an optical path to be T1, T2, and T3, respectively. In accordance with first color frame image data, second color frame image data and third color frame image data of a frame of color image, the image parsing module 35 obtains first color image data, second color image data and third color image data, obtains gray scale values corresponding to the first color, the second color and the third color of each pixel, and further obtains maximum gray scale values for each pixel point in the first color image data, the second color image data and the third image data, which are recorded as d1, d2 and d3, respectively, from statistics. The control device controls durations during which the light emitting device is turned on in modulation time periods of the first color, the second color and the third color to be: T1×d1/255, T2×d2/255, and T3×d3/255, respectively. In accordance with red frame image data, green frame image data, and blue frame image data of a frame of color image, the image parsing module 35 obtains data on four frames of image (i.e., the red frame image data, the green frame image data, the yellow frame image data, and the blue frame image data), obtains gray scale values corresponding to red, green, yellow and blue of each pixel, and further obtains the maximum gray scale values for each pixel point in the data on the four frames of image (i.e., the red frame image data, the green frame image data, the yellow frame image data, and the blue frame image data) from statistics. The maximum gray scale value for each pixel point in the red frame image data is set as d1, the maximum gray scale value for each pixel point in the green frame image data is set as d2, the maximum gray scale value for each pixel point in the yellow frame image data is set as d3, and the maximum gray scale value for each pixel point in the blue frame image data is set as d4. The first control unit 311 controls durations during which the light source 11 is turned on in modulation time periods of red light, green light, yellow light and blue light to be T1×d1/255, T2×d2/255, T3×d3/255, and T4×d4/255, respectively, thereby saving energy of the light source.

It can be understood that the light of the first color is not limited to red light, the light of the second color is not limited to green light, the light of the fourth color is not limited to blue light, and the light of the third color is not limited to yellow light. The light of the first color, the light of the second color, the light of the fourth color, and the light of the third color can be set as other colors. For example, the light of the first color can be blue light, the light of the second color can be red light, the light of the fourth color can be green light, and the light of the third color can be purple light.

In the image modulation method and the projection system 100 provided by the present disclosure, the light valve 20 takes the light of four different colors emitted from the light emitting device 10 as the light source for synthesizing a modulation image, thereby improving color diversity and color saturation. Moreover, since the modulation time periods for the first color and the second color by the light valve 20 are incorporated, the service life of the light valve 20 can be extended. In addition, in this embodiment, the wavelength converting material layer for light of the first color is a red phosphor, the wavelength converting material layer for light of the second color is a green phosphor, the wavelength converting material layer for light of the fourth color is a blue phosphor, and the wavelength converting material layer for light of the third color is a yellow phosphor. The converting efficiency of yellow light generated by the yellow phosphor being stimulated is higher than the converting efficiency of red light generated by the red phosphor being stimulated, which can supplement the brightness of red light to some extent and thus improve the display quality of the projection system 100.

It can be understood that the color wheel of the light emitting device 10 can be replaced by a band-shaped wavelength converting device, as long as the light emitting device 10 can emit light of different colors.

It can be understood that the light emitting device 10 of the projection system 100 can emit light of at least a first color, a second color and a third color, and the third color is a color mixing the first color and the second color.

It should be understood that those skilled in the art may make other changes within the spirit of the present disclosure for applying to the design of the present disclosure as long as it does not deviate from the technical effects of the present disclosure. All changes made in accordance with the spirit of the present disclosure will be included within the scope of the present disclosure.

What is claimed is:

1. A projection system, comprising:
    a light emitting device, configured to emit light of colors comprising at least a first color, a second color and a third color, wherein the third color is a color mixing the first color and the second color;
    a light valve; and
    a control device, configured to acquire data on an input image, and the data comprises gray scale values corresponding to at least the first color and the second color of each pixel point in the input image, and to determine gray scale values corresponding to the first color, the second color and the third color of a corresponding pixel point in a pre-displayed image in accordance with the gray scale values corresponding to the first color and the second color; wherein the gray scale value corresponding to the third color of the corresponding pixel point in the pre-displayed image is smaller than or equal to a smaller one of the gray scale value corresponding to the first color of the corresponding pixel point in the data on the input image and the gray scale value corresponding to the second color of the corresponding pixel point in the data on the input image; and wherein the gray scale value corresponding to the first color of the corresponding pixel point in the pre-displayed image is equal to a gray scale value difference between the gray scale value corresponding to the first color of the corresponding pixel point in the data on the input image and the gray scale value corresponding to the third color of the corresponding pixel point in the data on the input image, and the gray scale value corresponding to the second color of the corresponding pixel point in the pre-displayed image is equal to a gray scale value difference between the gray scale value corresponding to the second color of the corresponding pixel point in the data on the input image and the gray scale value corresponding to the third color of the corresponding pixel point in the data on the input image; and
    wherein the control device is further configured to control the light valve to modulate light of corresponding colors emitted from the light emitting device in accordance with the determined gray scale values corresponding to the corresponding colors of each pixel point in the pre-displayed image, so as to form an image corresponding to the pre-displayed image.

2. The projection system according to claim 1, wherein the light emitting device is configured to emit light of a fourth color, the data on the input image further comprises a gray scale value corresponding to the fourth color of each pixel point in the input image, the control device is configured to determine a gray scale value corresponding to the fourth color of a corresponding pixel point in the pre-displayed image according to the gray scale value corresponding to the fourth color of each pixel point in the input image, and the control device is configured to control the light valve to perform modulation in accordance with the gray scale value corresponding to the fourth color of a corresponding pixel point in the pre-displayed image when the light emitting device emits the fourth color.

3. The projection system according to claim 1, wherein the gray scale values of the first color and the second color of one pixel point in the input image are respectively N1 and N2, wherein N1≥N2, the control device controls the light valve to perform modulation by taking a gray scale value as N2 when the light emitting device emits light of the third color, and the control device controls the light valve to perform modulation by taking a gray scale value at a corresponding pixel point as (N1−N2) when the light emitting device emits light of the first color.

4. The projection system according to claim 3, wherein the light emitting device comprises a light source and a color wheel, and the color wheel comprises a first section, a second section, and a third section; when light emitted from the light source illuminates the first section, the second section, and the third section, the light of the first color, the light of the second color and the light of the third color are respectively emitted, wherein the control device controls time periods during which the first section, the second section and the third section are in an optical path to be T1, T2, and T3, respectively; in accordance with first color frame image data, second color frame image data and third color frame image data of a frame of color image, an image parsing module obtains first color image data, second color image data and third color image data, obtains gray scale values corresponding to the first color, the second color and the third color of each pixel, and further obtains maximum gray scale values for each pixel point in the first color image data, the second color image data and the third image data, which are recorded as d1, d2 and d3, respectively, from statistics; and wherein the control device controls durations during which the light emitting device is turned on in modulation time periods of the first color, the second color and the third color to be: T1×d1/255, T2×d2/255, and T3×d3/255, respectively.

5. The projection system according to claim 4, wherein the control device controls time periods during which the first section, the second section and the third section are in the optical path to be T1, T2 and T3, respectively, the control device controls a duration during which the first section is illuminated by the light source to be T1×((N1−N2)/255), sets a duration during which the second section is illuminated by the light source as 0, and controls a duration during which the third section is illuminated by the light source to be T1×(N2/255).

6. The projection system according to claim 4, wherein the light source is an excitation light source, the first section supports a wavelength converting material layer for light of the first color, the wavelength converting material layer for light of the first color is capable of absorbing excitation light and emits the light of the first color, the second section supports a wavelength converting material layer for light of the second color, the wavelength converting material layer for light of the second color is capable of absorbing excitation light and emits the light of the second color, and the third section supports a wavelength converting material layer for light of the third color and is capable of absorbing excitation light and emits the light of the third color.

7. The projection system according to claim 6, wherein the wavelength converting material layer for light of the first color is a red phosphor, the wavelength converting material layer for light of the second color is a green phosphor, and the wavelength converting material layer for light of the third color is a yellow phosphor.

8. The projection system according to claim 4, wherein the color wheel further comprises a fourth section, a fourth color light is emitted when the light emitted from the light source illuminates the fourth section; the data on the input image comprises a gray scale value corresponding to the fourth color of each pixel point in the input image, and the control device is configured to determine the gray scale value corresponding to the fourth color of the corresponding pixel point in the pre-displayed image in accordance with the gray scale value corresponding to the fourth color; and the control device is configured to control the light valve to perform modulation according to the gray scale value corresponding to the fourth color of the corresponding pixel point in the pre-displayed image when the color wheel emits the fourth color.

9. The projection system according to claim 8, wherein the light source is a blue excitation light source and the fourth section is a light transmissive layer that can transmit blue light.

10. The projection system according to claim 1, wherein the first color is red, the second color is green, and the third color is yellow.

11. An image modulation method, applied to a projection system, wherein the image modulation method comprises following steps of:

acquiring data on an input image, the data comprising gray scale values corresponding to at least the first color and the second color of each pixel point in the input image;

determining gray scale values corresponding to the first color, the second color and the third color of a corresponding pixel point in a pre-displayed image in accordance with the gray scale values corresponding to the first color and the second color; wherein the third color is a color mixing the first color and the second color, the gray scale value corresponding to the third color of the corresponding pixel point in the pre-displayed image is smaller than or equal to a smaller one of the gray scale value corresponding to the first color of the corresponding pixel point in the data on the input image and the gray scale value corresponding to the second color of the corresponding pixel point in the data on the input image; and wherein the gray scale value corresponding to the first color of the corresponding pixel point in the pre-displayed image is equal to a gray scale value difference between the gray scale value corresponding to the first color of the corresponding pixel point in the data on the input image and the gray scale value corresponding to the third color of the corresponding pixel point in the data on the input image, and the gray scale value corresponding to the second color of the corresponding pixel point in the pre-displayed image is equal to a gray scale value difference between the gray scale value corresponding to the second color of the corresponding pixel point in the data on the input image and the gray scale value corresponding to the third color of the corresponding pixel point in the data on the input image; and controlling a light valve to modulate light of corresponding colors emitted from the light emitting device in accordance with the determined gray scale values corresponding to the corresponding colors of each pixel point in the pre-displayed image, so as to form an image corresponding to the pre-displayed image.

12. The image modulation method according to claim 11, wherein the acquired data on the input image further comprises a gray scale value corresponding to a fourth color of each pixel point in the input image, a gray scale value corresponding to the fourth color of a corresponding pixel point in the pre-displayed image is determined according to the gray scale value corresponding to the fourth color of each pixel point in the input image, and the light valve is controlled to perform modulation in accordance with the gray scale value corresponding to the fourth color of a corresponding pixel point in the pre-displayed image when the light emitting device emits the fourth color.

13. The image modulation method according to claim 11, wherein the gray scale values of the first color and the second color of one pixel point in the input image are respectively N1 and N2, wherein N1≥N2, the light valve is controlled to perform modulation at a corresponding pixel point by taking a gray scale value as N2 when the light emitting device emits light of the third color, the light valve is controlled to perform modulation by taking a gray scale value at a corresponding pixel point as (N1−N2) when the light emitting device emits light of the first color, and the light valve is controlled to stop working in a time period during which the light emitting device is designed to emit light of the second color.

14. The image modulation method according to claim 13, wherein the light emitting device comprises a light source and a color wheel, and the color wheel comprises a first section, a second section, and a third section; when light emitted from the light source illuminates the first section, the second section, and the third section, the light of the first color, the light of the second color and the light of the third color are respectively emitted, wherein time periods during which the first section, the second section and the third section are in an optical path are controlled to be T1, T2 and T3, respectively; in accordance with first color frame image data, second color frame image data and third color frame image data of a frame of color image, first color image data, second color image data and third color image data is obtained, gray scale values corresponding to the first color, the second color and the third color of each pixel are obtained, and maximum gray scale values for each pixel point in the first color image data, the second color image data and the third image data, which are recorded as d1, d2 and d3, respectively, are further obtained from statistics; and wherein durations during which the light emitting device is turned on in modulation time periods of the first color, the second color and the third color are controlled to be T1×d1/255, T2×d2/255, and T3×d3/255, respectively.

15. The image modulation method according to claim 14, wherein in the step of controlling the light device to alternately emit the light of the first color, the light of the second color and the light of the third color, time periods during which the first section, the second section, the third section and the fourth section of the color wheel are in the optical path are controlled to be T1, T2 and T3, respectively, a duration during which the first section is illuminated by the light source is controlled to be T1×((N1−N2)/255), a duration during which the second section is illuminated by the light source is controlled to be 0, and a duration during which the third section is illuminated by the light source is controlled to be T1×(N2/255).

16. The image modulation method according to claim 14, wherein the light source is an excitation light source, the first section supports a wavelength converting material layer for light of the first color, the wavelength converting material layer for light of the first color is capable of absorbing excitation light and emits the light of the first color, the second section supports a wavelength converting material layer for light of the second color, the wavelength converting material layer for light of the second color is capable of absorbing excitation light and emits the light of the second color, and the third section supports a wavelength converting material layer for light of the third color and is capable of absorbing excitation light and emits the light of the third color.

17. The image modulation method according to claim 16, wherein the wavelength converting material layer for light of the first color is a red phosphor, the wavelength converting material layer for light of the second color is a green phosphor, and the wavelength converting material layer for light of the third color is a yellow phosphor.

18. The image modulation method according to claim 16, wherein the color wheel further comprises a fourth section, a fourth color light is emitted when the light emitted from the light source illuminates the fourth section; the data on the input image comprises a gray scale value corresponding to the fourth color of each pixel point in the input image, and the gray scale value corresponding to the fourth color of the corresponding pixel point in the pre-displayed image is determined in accordance with the gray scale value corresponding to the fourth color; and the light valve is controlled to perform modulation according to the gray scale value corresponding to the fourth color of the corresponding pixel point in the pre-displayed image, when the color wheel emits the fourth color.

19. The image modulation method according to claim 18, wherein the light source is a blue excitation light source and the fourth section is a light transmissive layer that can transmit blue light.

20. The image modulation method according to claim 11, wherein the first color is red, the second color is green, and the third color is yellow.

* * * * *